March 21, 1967 J. R. YANCEY 3,310,107
UNDERWATER WELL METHOD AND APPARATUS
Filed Oct. 23, 1963 15 Sheets-Sheet 7
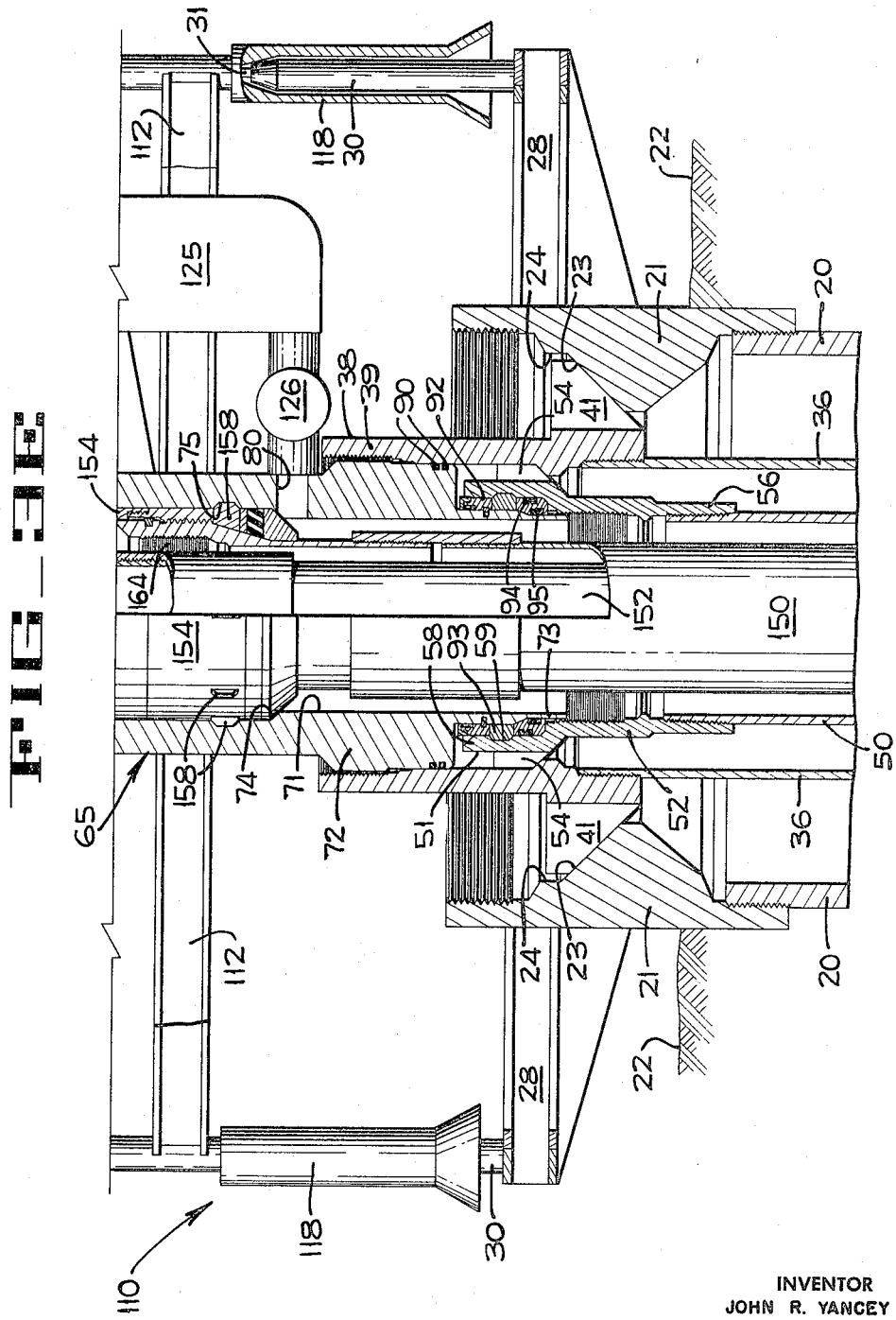
FIG_3E
INVENTOR
JOHN R. YANCEY
BY *Hans G. Hoffmeister*
ATTORNEY

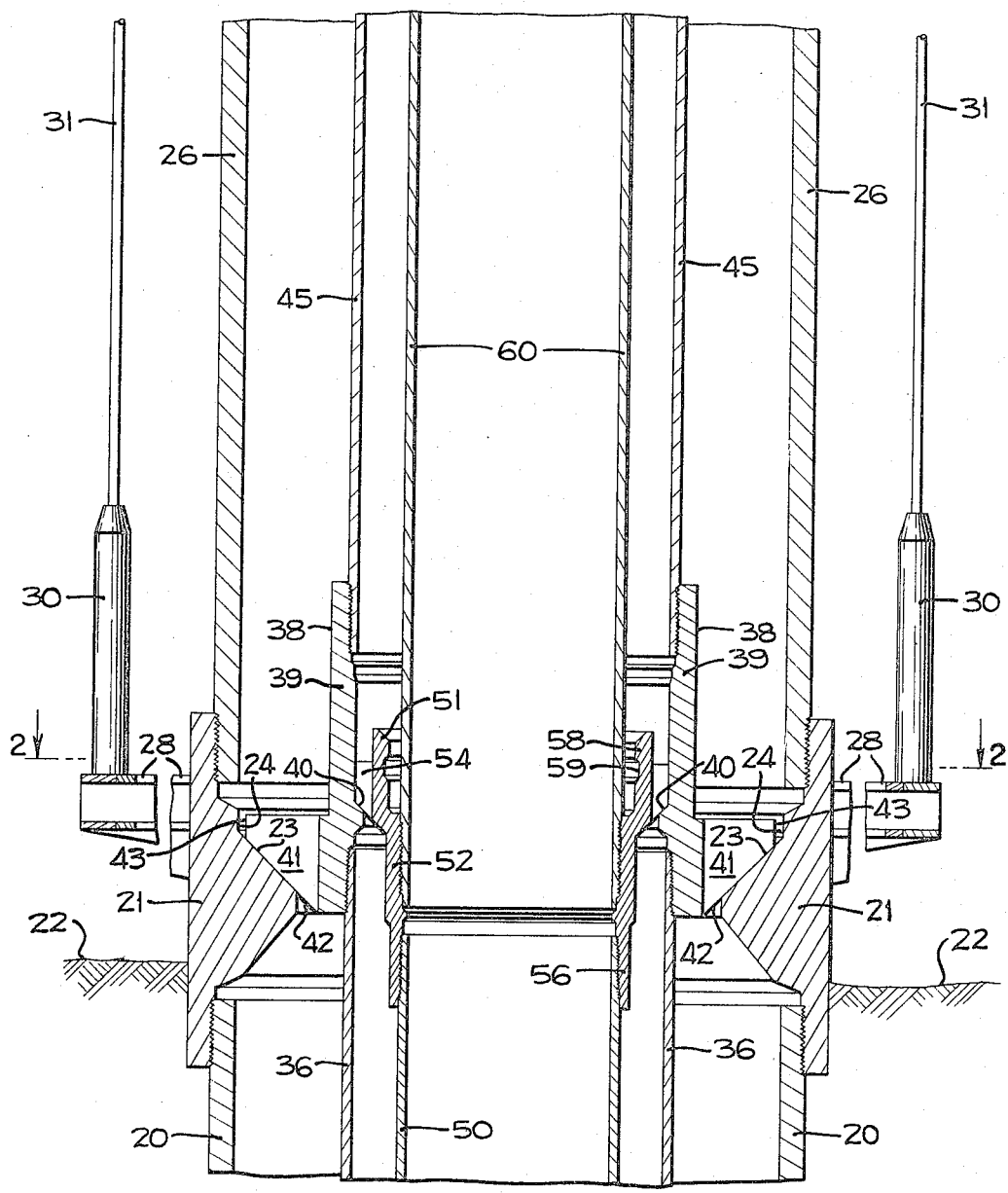

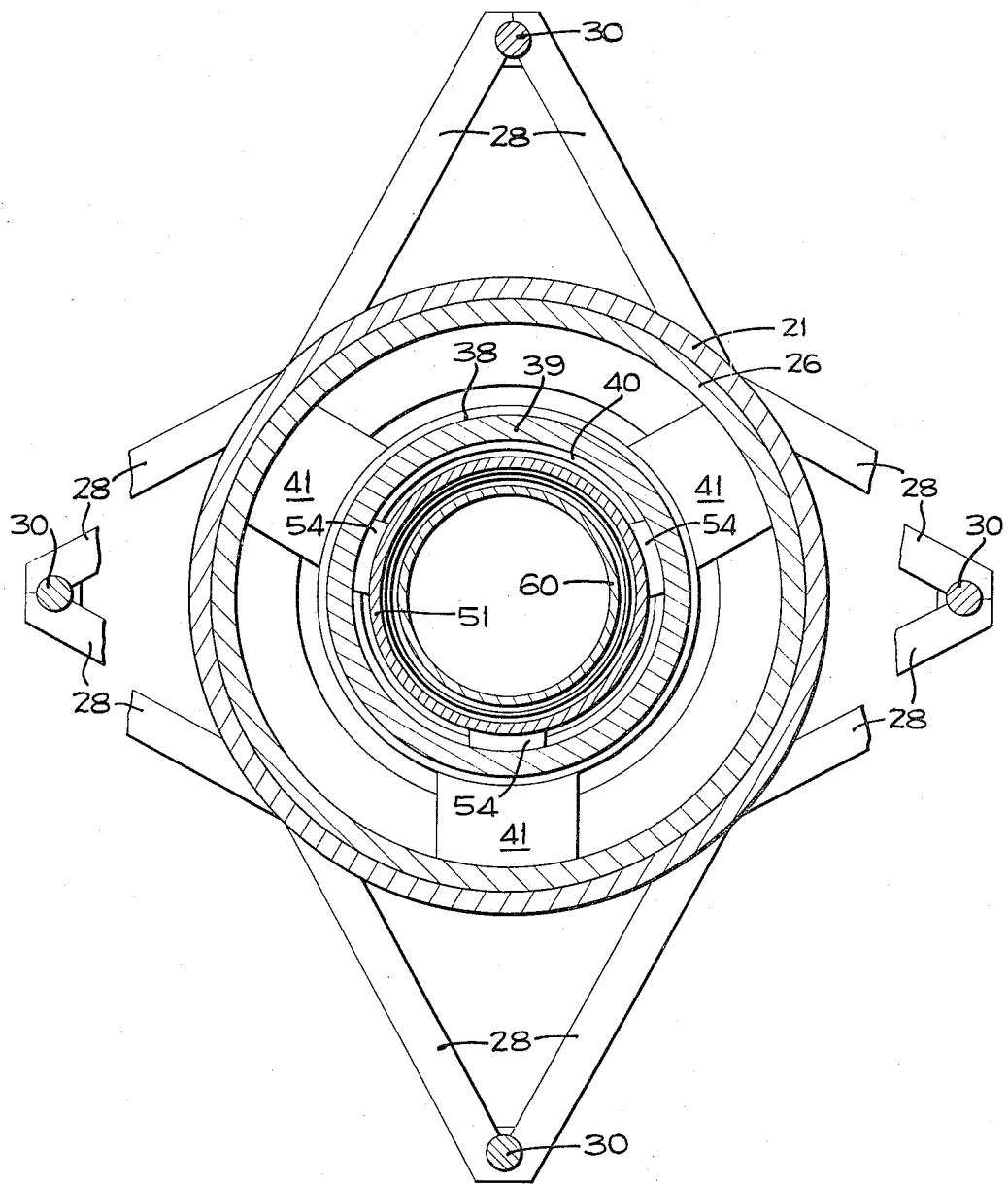

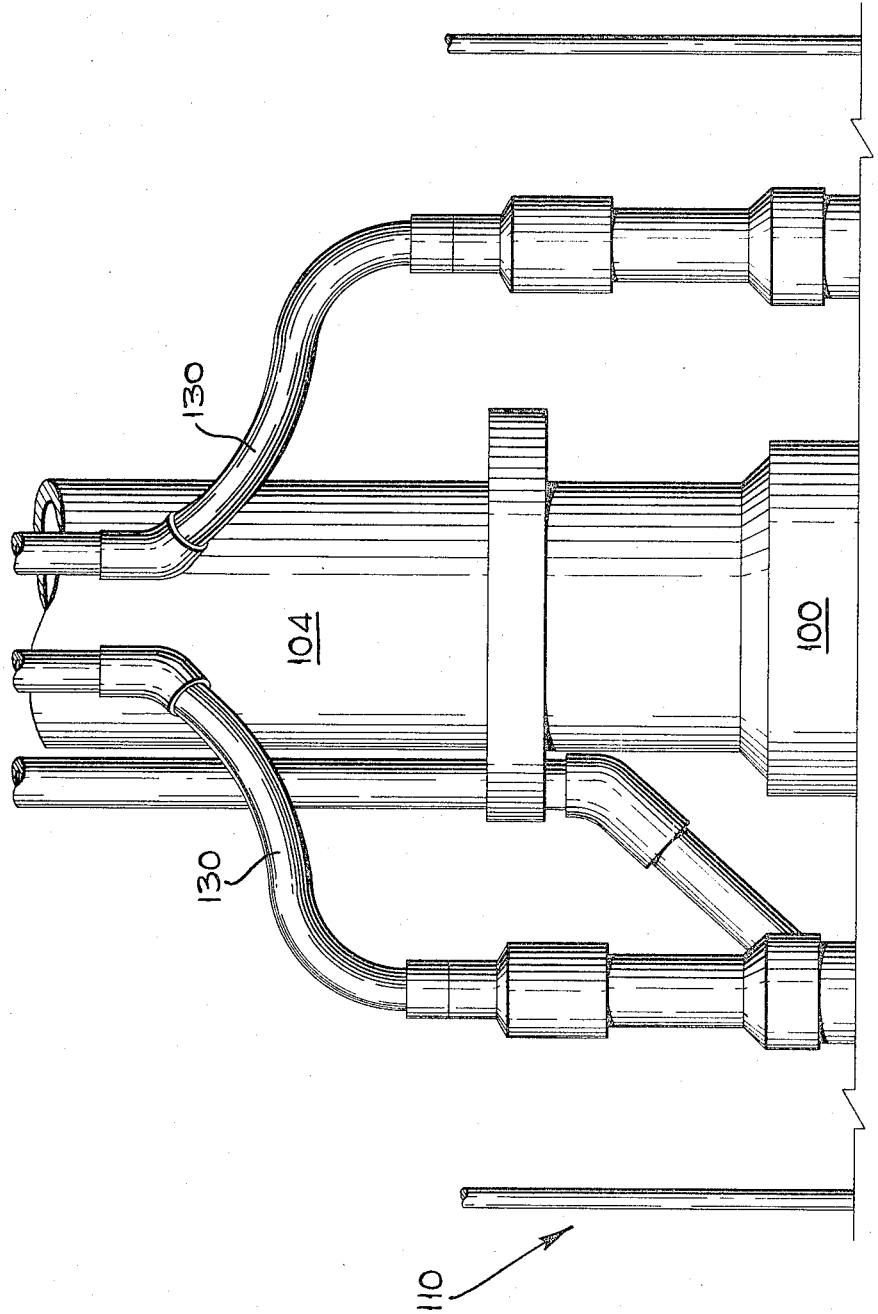

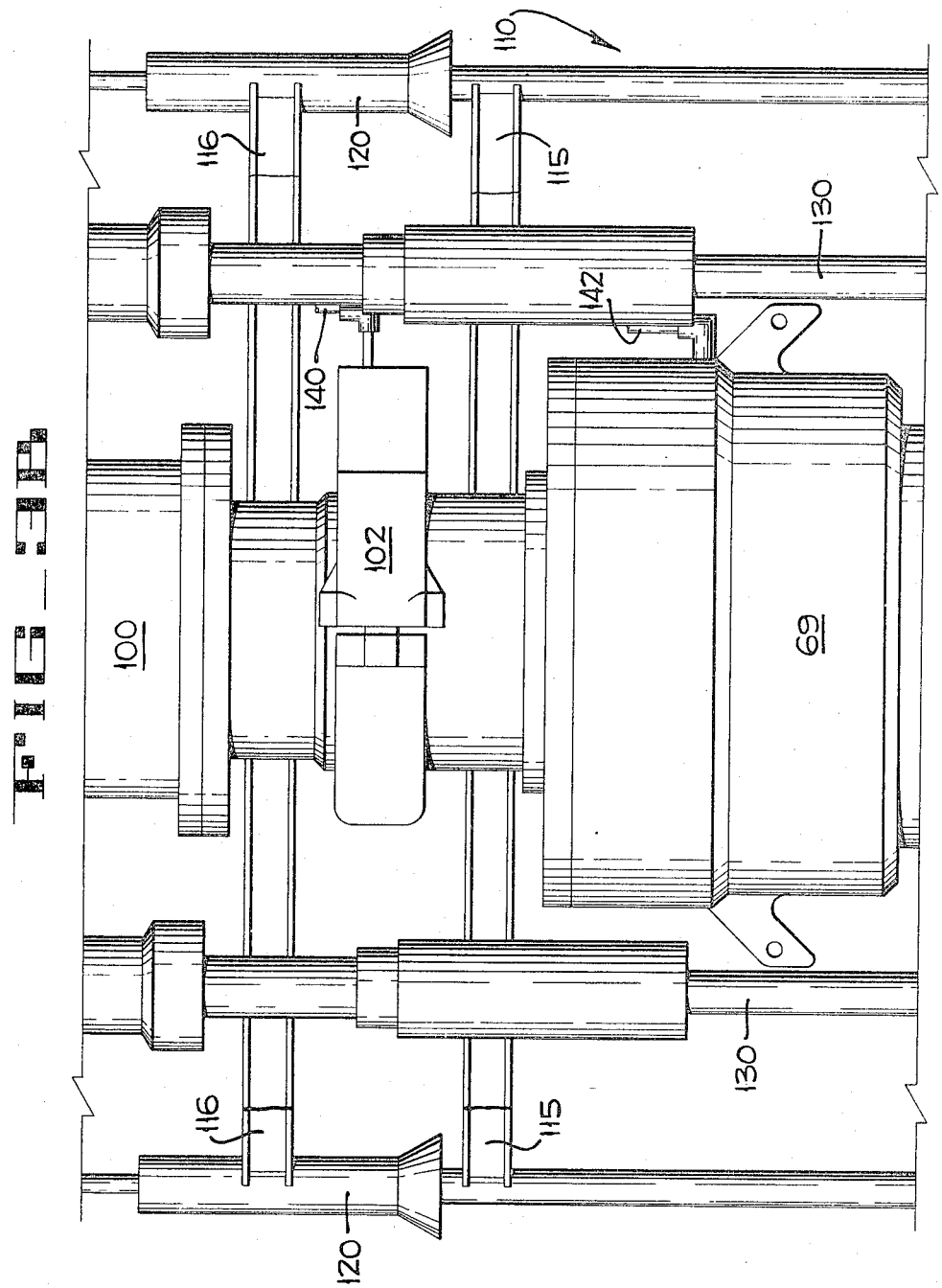

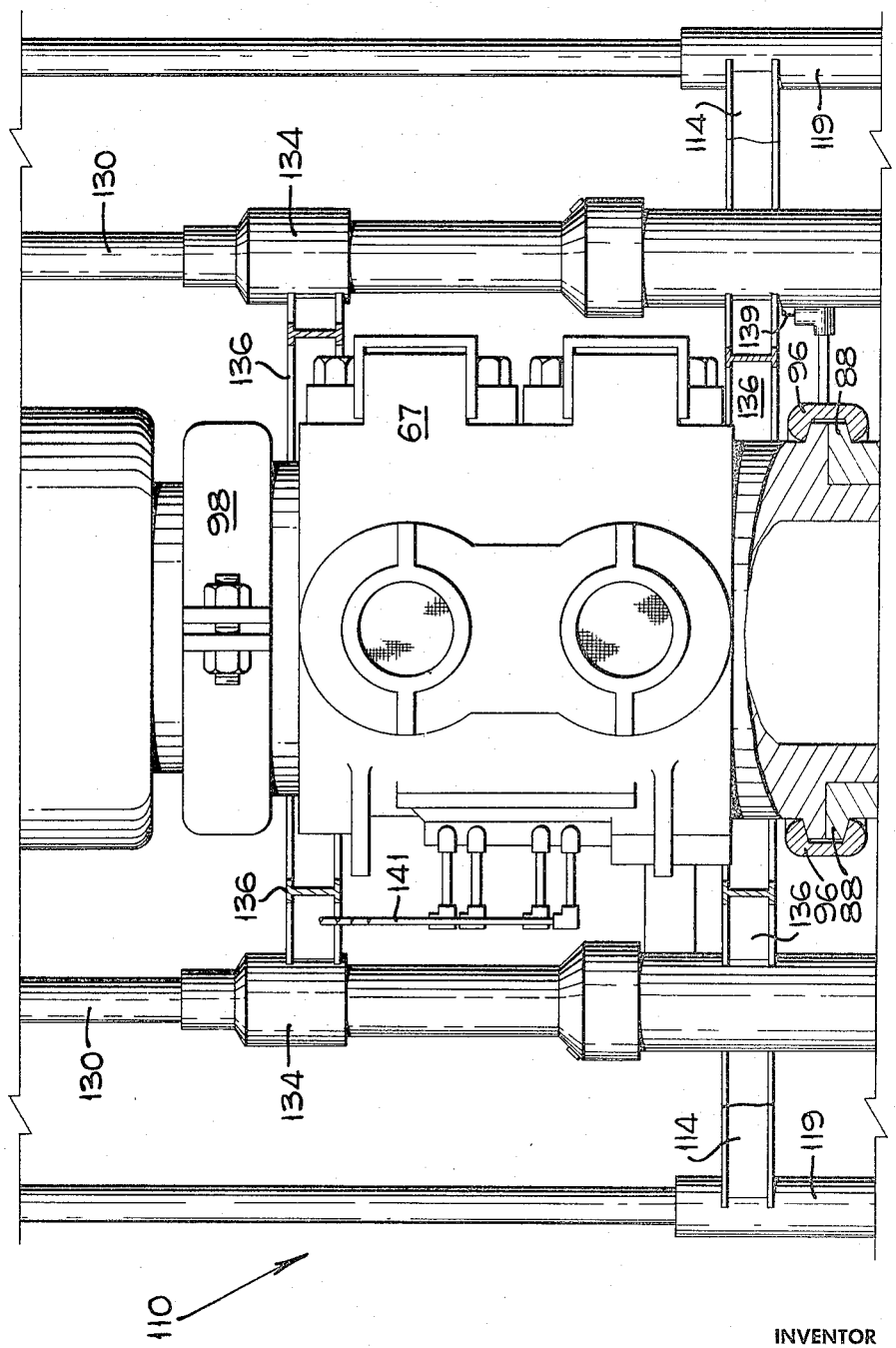

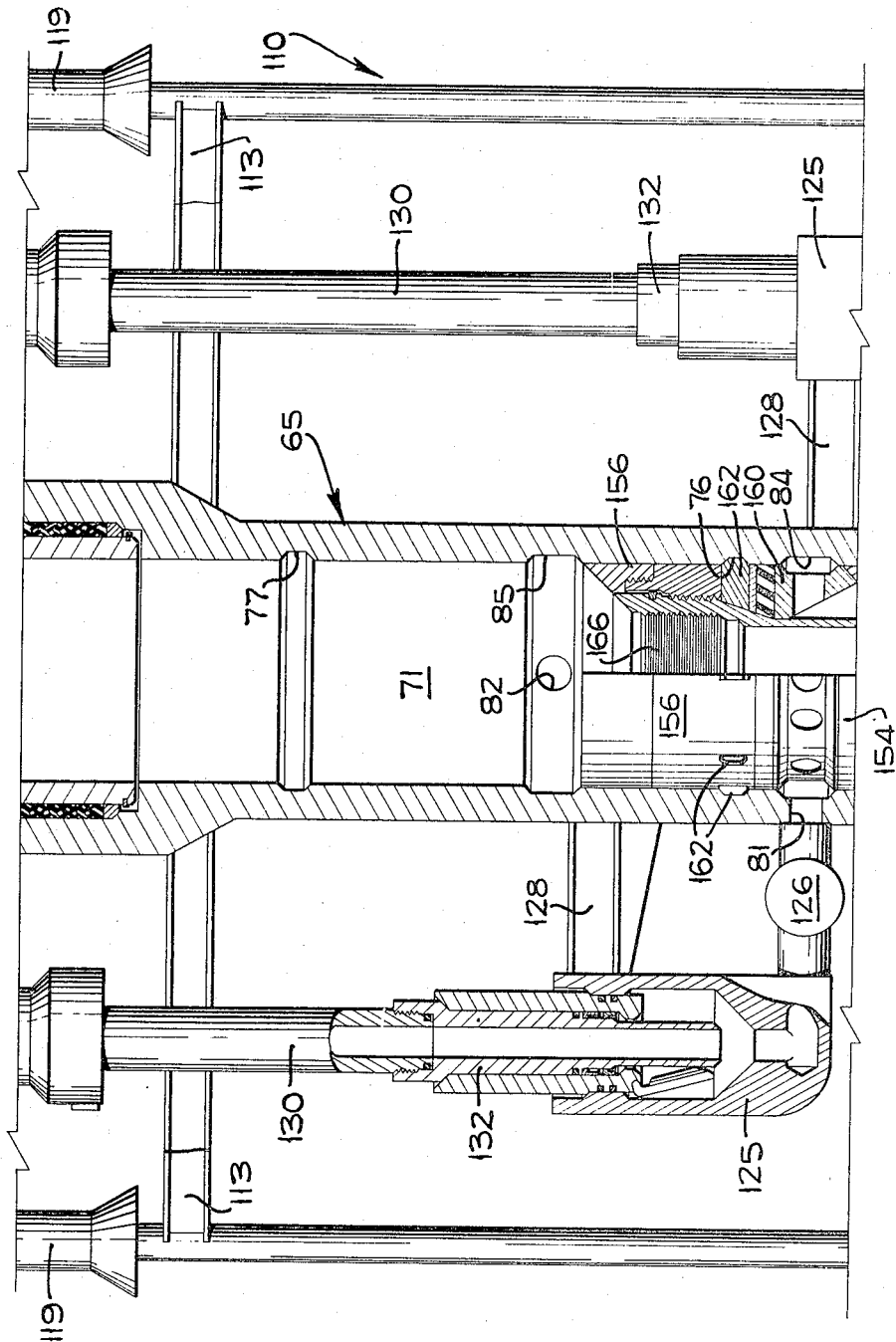

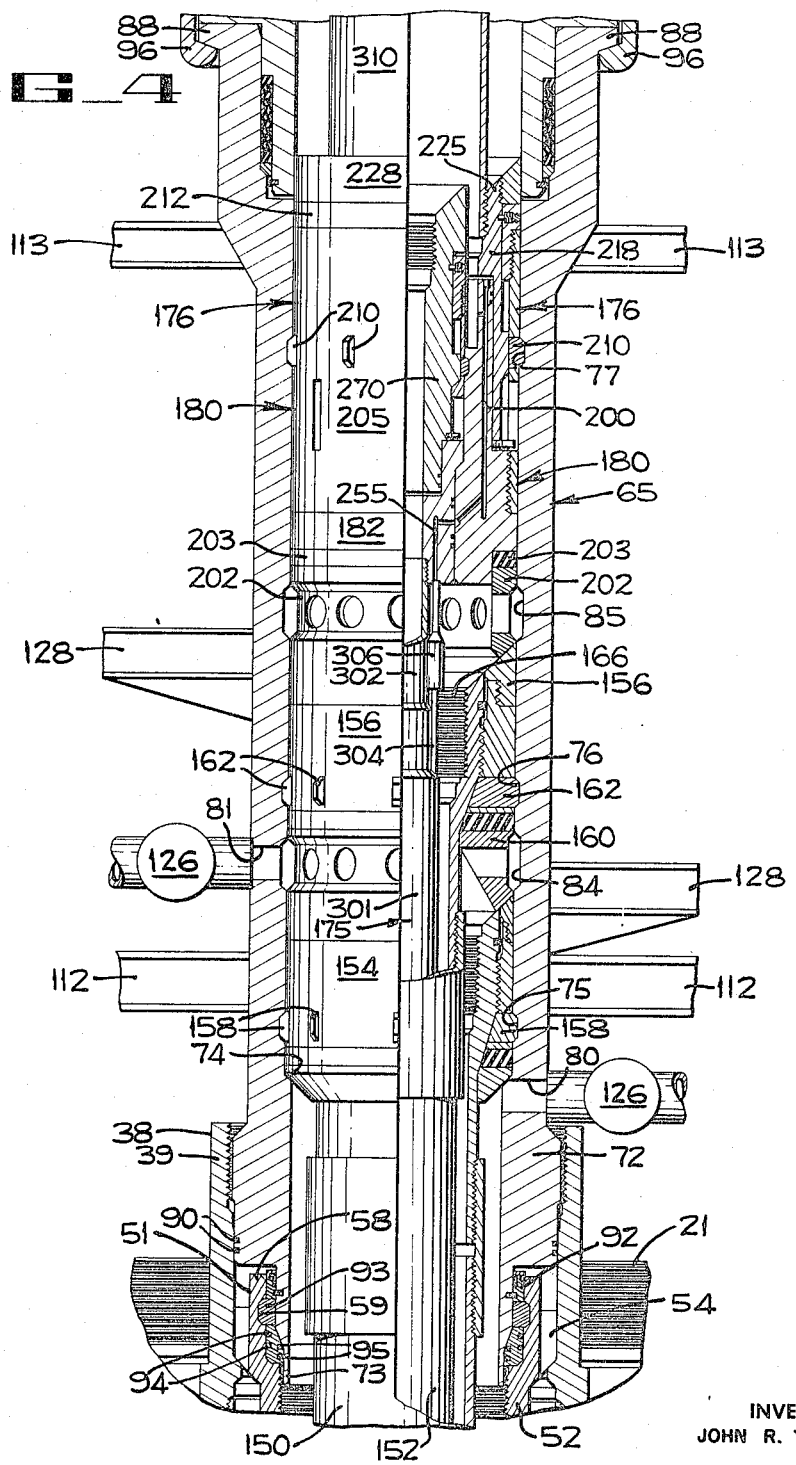

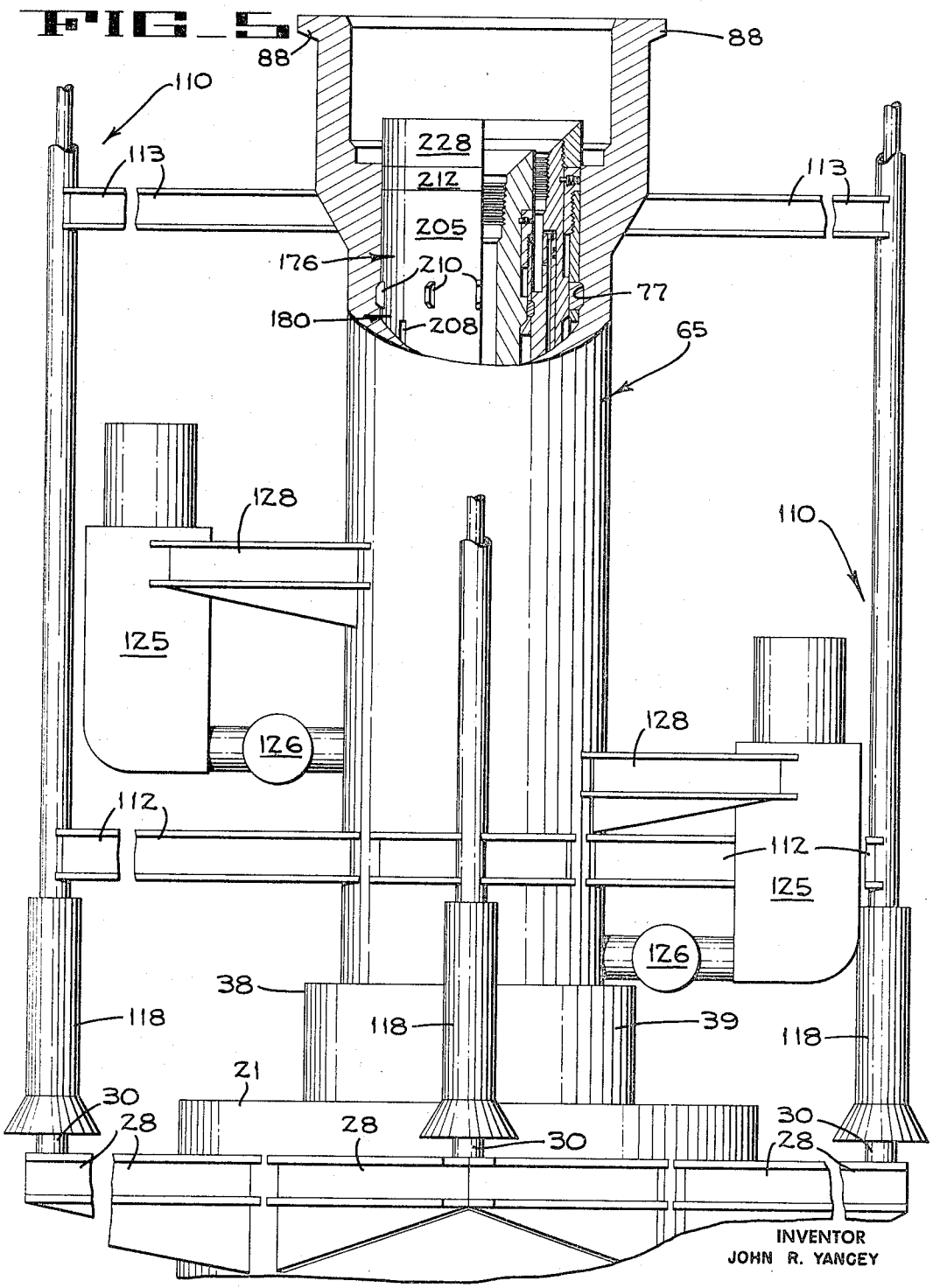

March 21, 1967 J. R. YANCEY 3,310,107
UNDERWATER WELL METHOD AND APPARATUS
Filed Oct. 23, 1963 15 Sheets-Sheet 10
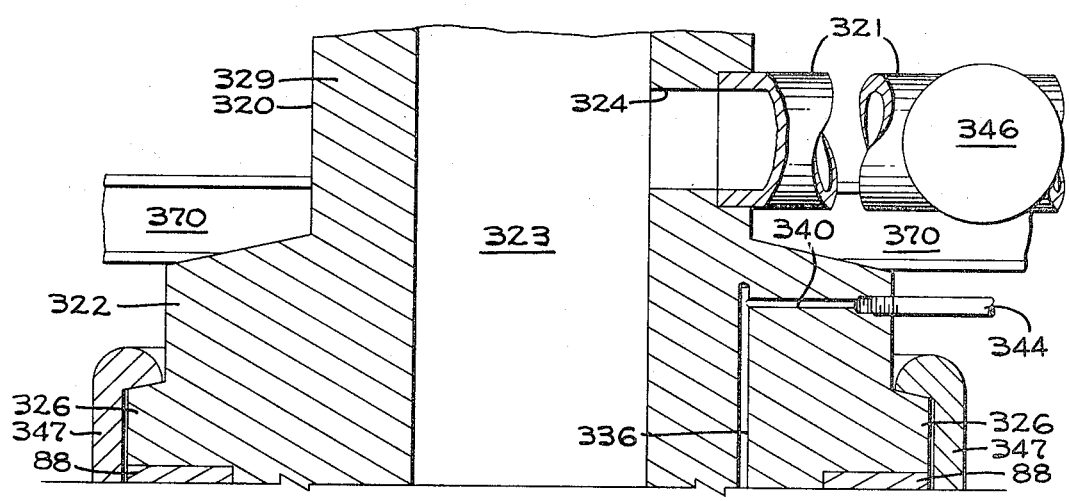
FIG_6A
INVENTOR
JOHN R. YANCEY
BY Hans G. Hoffmeister
ATTORNEY

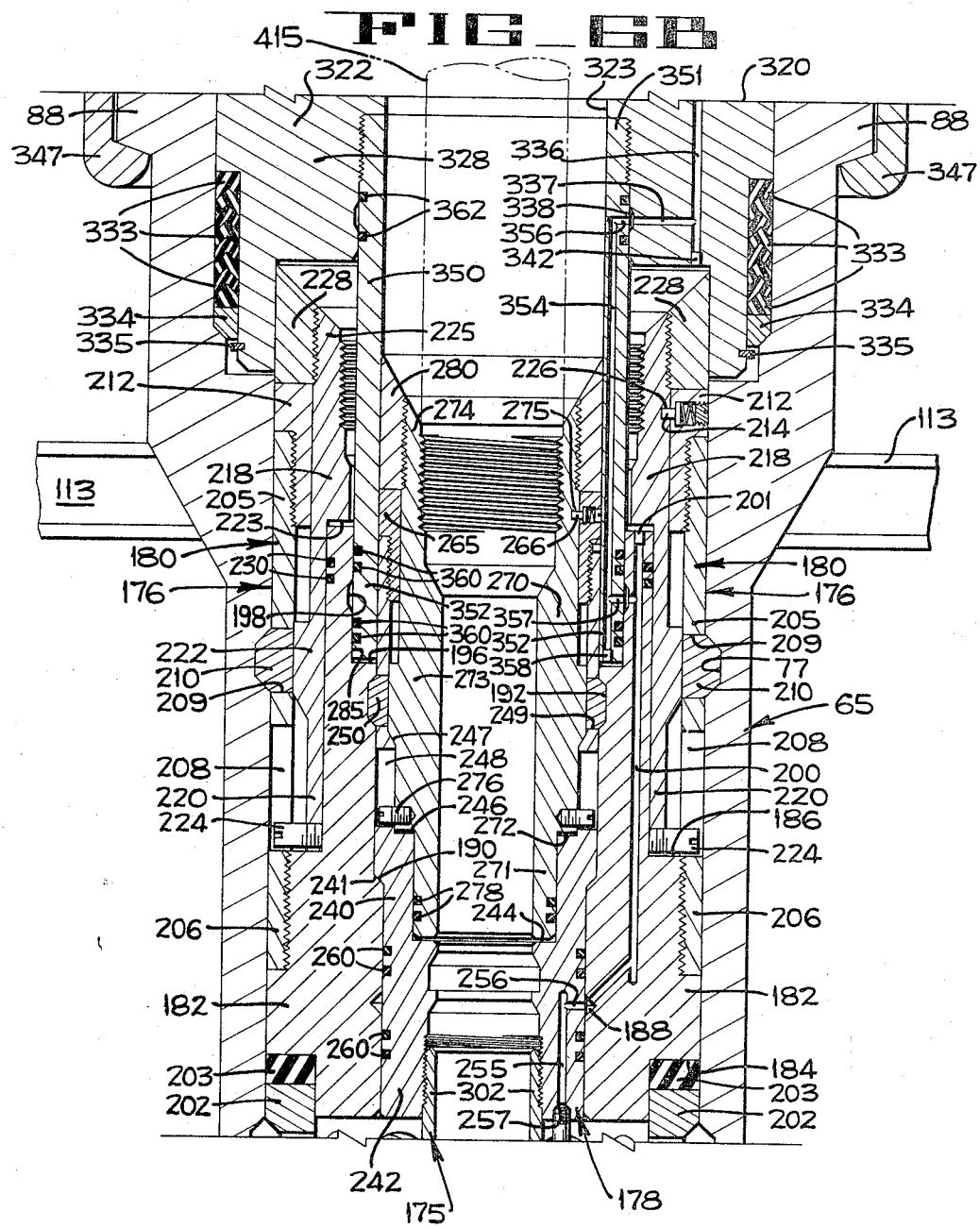

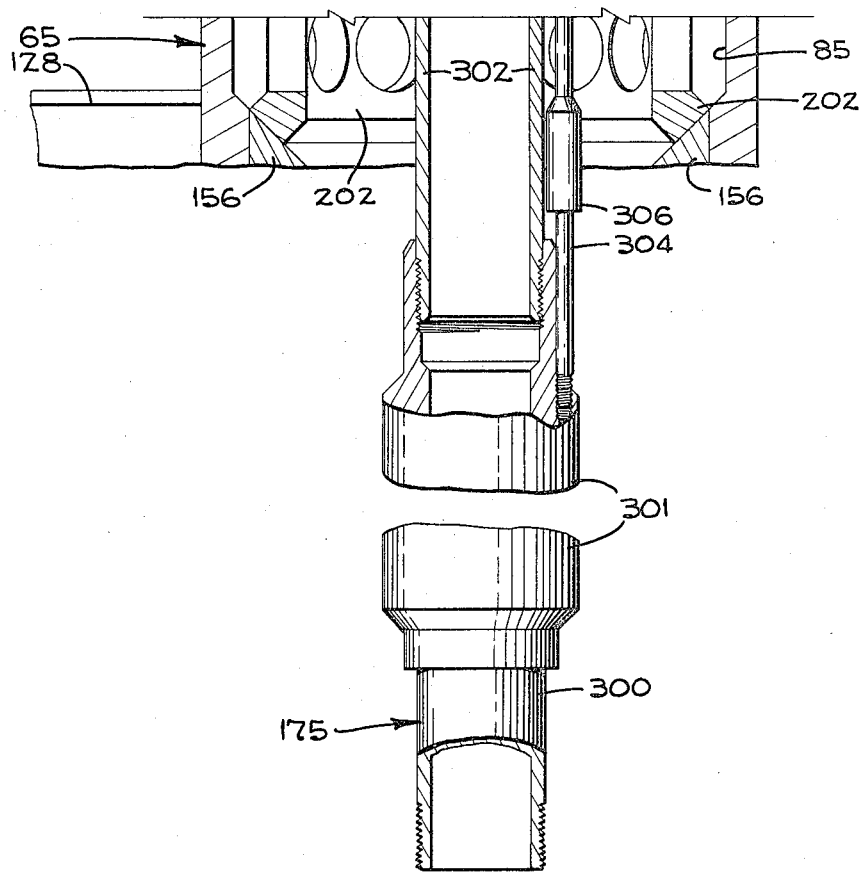

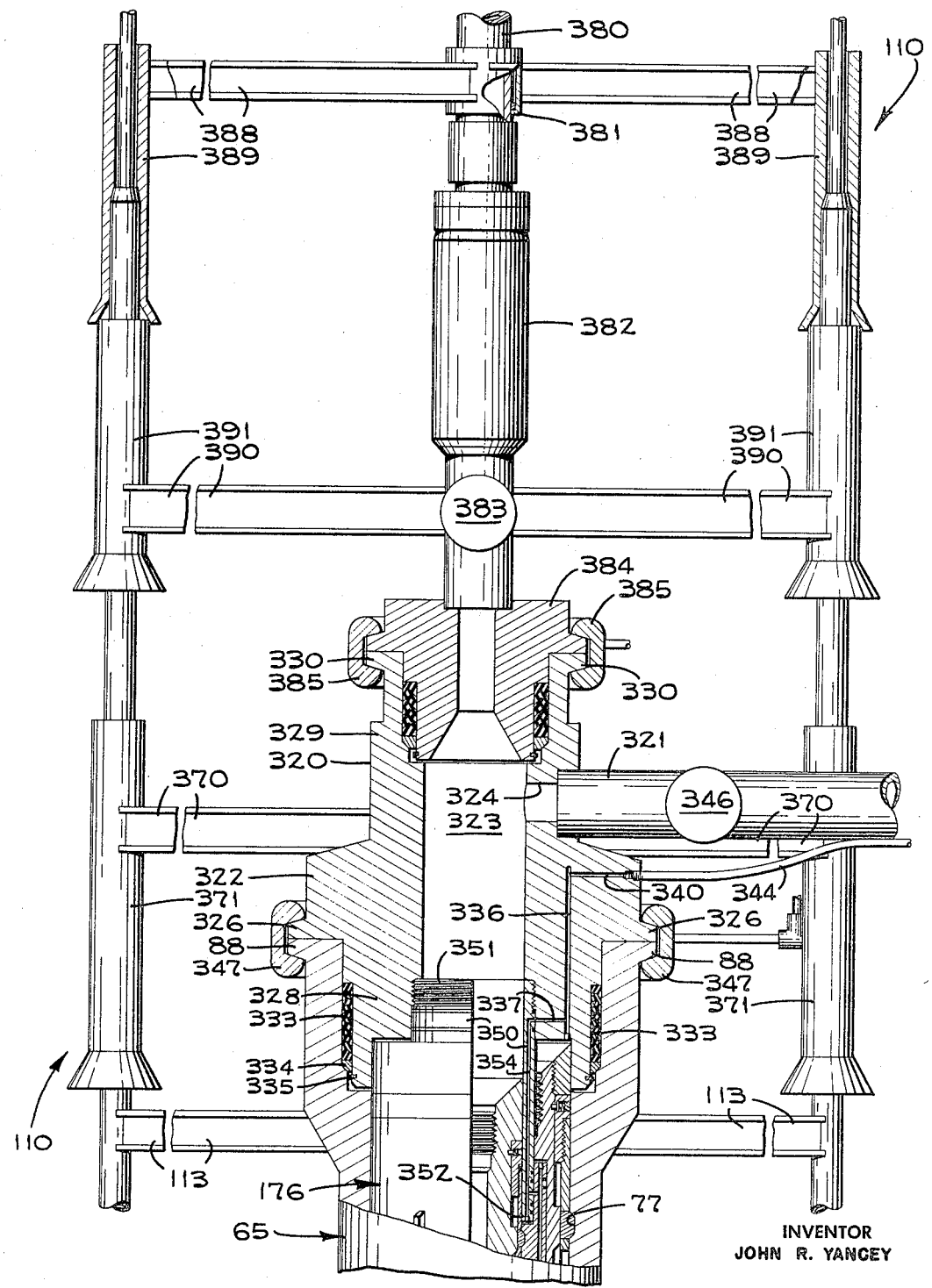

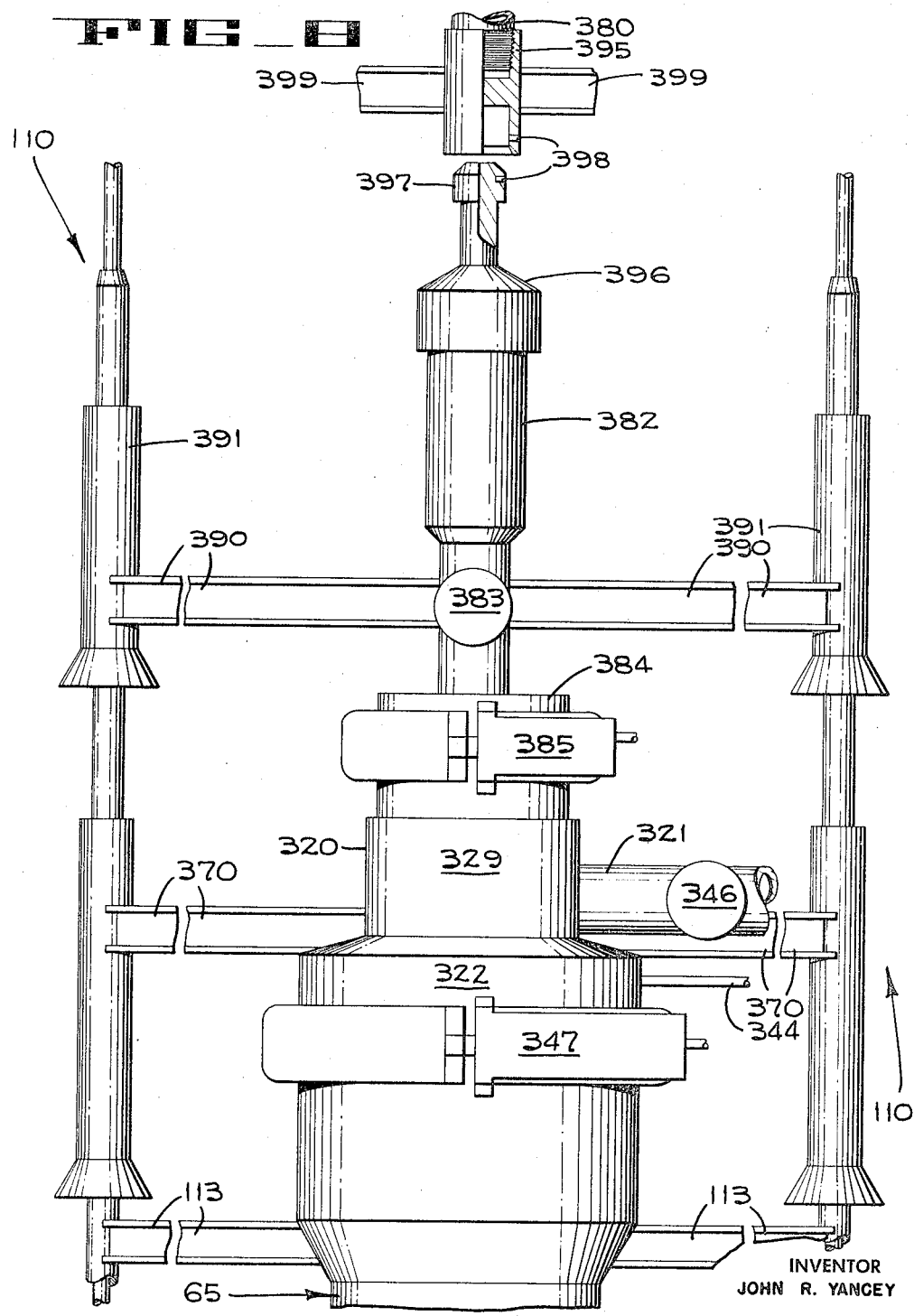

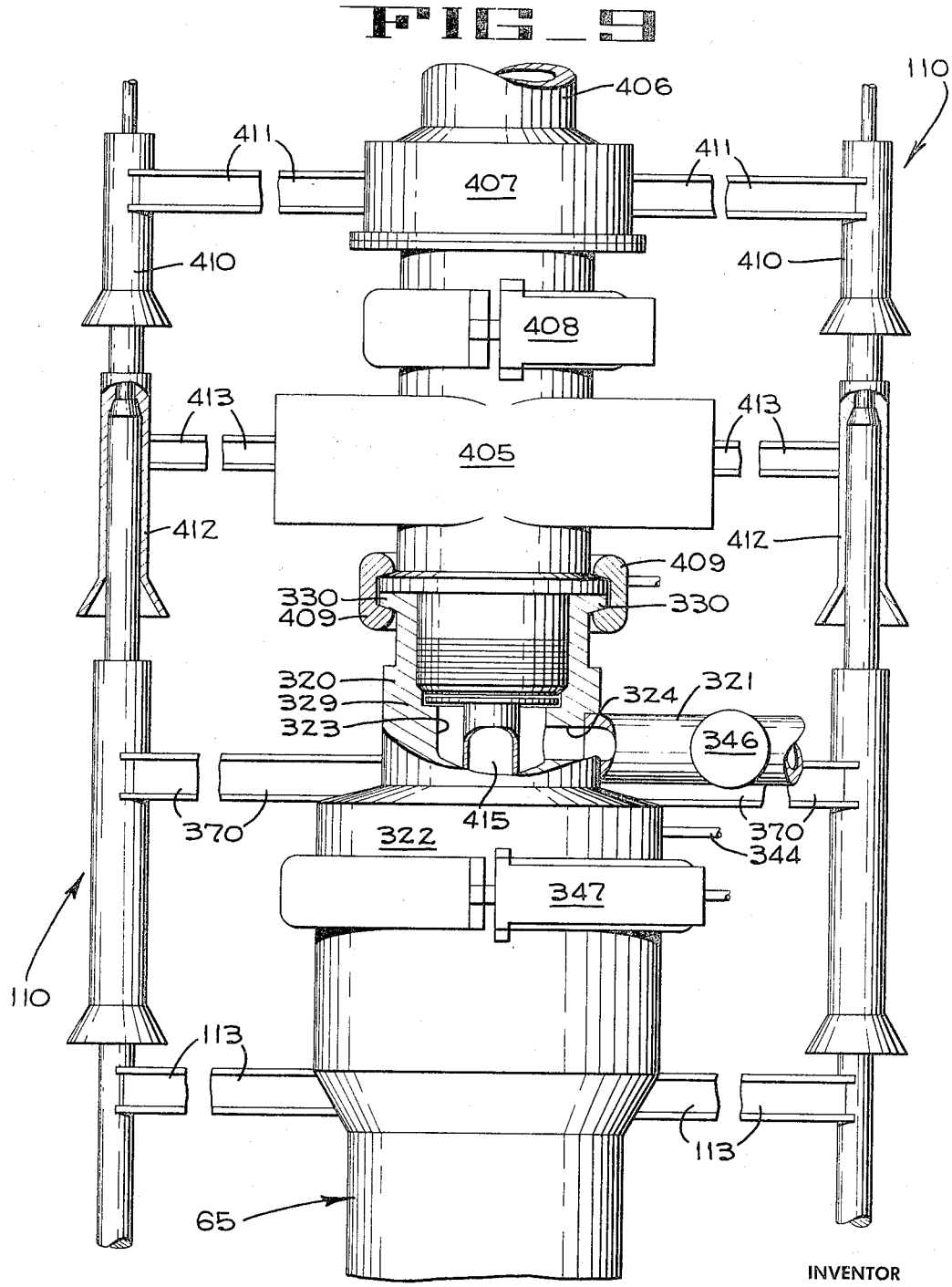

United States Patent Office 3,310,107
Patented Mar. 21, 1967

3,310,107
UNDERWATER WELL METHOD AND
APPARATUS
John R. Yancey, Houston, Tex., assignor to FMC Corporation, San Jose, Calif., a corporation of Delaware
Filed Oct. 23, 1963, Ser. No. 318,318
22 Claims. (Cl. 166—0.6)

The present invention pertains to an underwater well method and apparatus and more particularly to a method and apparatus for completing an underwater well and for facilitating reworking and servicing of the well while maintaining the well under complete control.

In underwater wells, as in other wells, control of the well is essential to avoid blowouts and is normally achieved by blowout preventers during drilling and by a christmas tree during production of the well. However, it is necessary to remove the blowout preventers in order to replace them with the christmas tree or other flow control apparatus. Likewise, it is necessary to remove the tree and replace it with blowout preventers if the well needs reworking or servicing. If conventional procedures are followed, there are periods of time when neither a blowout preventer nor a christmas tree is in control of the well. With certain prior methods and apparatus used for interchanging preventers and trees, wells have been temporarily left open during these periods thereby risking a blowout.

In addition to the problem of control in an underwater well, replacement of the entire christmas tree and flow line with a blowout preventer in order to rework the well is an onerous, time-consuming, and expensive task. Yet, prior art methods and apparatus require movement of the flow line before the well can be reworked.

It is an object of the present invention to provide a method and apparatus for completing an underwater well.

Another object is to provide method and apparatus for facilitating reworking and servicing of an underwater well.

Another object is to provide a method and apparatus for controlling high pressures in a well and preventing blowouts during completion, workover, and servicing of the well.

Another object is to provide a method and apparatus for landing a flow line adjacent to the ocean floor, below diver depth, and for automatically coupling the flow line to the production tubing.

Another object is to rework an underwater well without disturbing the flow line.

Another object is to provide a tubing hanger that establishes fluid communication between a master control valve in the production tubing and a valve control line extending to a control station remote from the valve.

Another object is to provide a tubing hanger that is capable of landing in a wellhead and of being coupled to a flow line adapter and that enables tubing to be lifted out of and lowered into the wellhead through the adapter without moving the adapter.

These objects, together with other objects and advantages, will become apparent on reference to the following description and accompanying drawings, in which:

FIG. 1 is a fragmentary vertical section of a portion of the subject well apparatus and shows the apparatus after several strings of casing have been installed in the well.

FIG. 2 is a fragmentary horizontal section taken on a plane at a position indicated by line 2—2 in FIG. 1.

FIGS. 3A, 3B, 3C, 3D, and 3E when placed edge to edge with their respective figure designations right side up and with FIG. 3A at the top and FIG. 3E at the bottom, constitute a fragmentary side elevation, with portions broken away, of the subject well apparatus after the wellhead and blowout preventers and two additional strings of casing have been installed in the well.

FIG. 4 is a fragmentary vertical section of the wellhead of FIGS. 3D and 3E and, in addition, shows a dual tubing hanger of the present invention hanging a string of tubing from the wellhead.

FIG. 5 is a fragmentary side elevation of the well apparatus after all of the casing and tubing have been hung in the well and after the blowout preventers have been removed from the wellhead.

FIGS. 6A, 6B, and 6C, when placed end to end with FIG. 6B in the center and overlapping FIGS. 6A and 6C respectively at the top and bottom, constitute an enlarged longitudinal section of the wellhead and dual tubing hanger (FIG. 6B), a master control valve in the tubing string (FIG. 6C), the valve being connected to the hanger, and a flow line adapter (FIG. 6A) connected to the wellhead.

FIG. 7 is a fragmentary side elevation of the well apparatus adjacent to and above the upper end of the wellhead and shows a swab valve and a bottom hole test adapter connected to the flow line adapter.

FIG. 8 is a view similar to FIG. 7, although more completely in side elevation, and shows a plug connected to the bottom hole test adapter and a running tool above the plug.

FIG. 9 is a view similar to FIG. 8, but shows a reworking or servicing blowout preventer connected to the flow line adapter in place of the swab valve and test adapter.

With reference to FIG. 1, the first step of completing an underwater well in accordance with the present invention is to drive a surface casing 20, for example, a thirty-six inch casing, to the desired depth in the ocean floor. Since the condition of the ocean floor is predetermined, it is known approximately how deep the casing can be driven. Thus, a first stop collar 21 is connected to the upper end of the surface casing, at the surface of the water, so that this collar is located at the mudline, indicated at 22, when the surface casing is at its final depth. The stop collar has an internal, downwardly convergent, frusto-conical seat 23 and a cylindrical surface 24 extending upward from this seat. A surface conductor 26 is threaded into the stop collar and extends to the surface, not shown, of the water.

Horizontal brackets 28 are secured to the stop collar 21 and extend radially outward on opposite sides thereof. Guide posts 30 have lower ends secured to the brackets and project upward in parallel relation to the surface conductor 26. Cables 31 have lower ends within and connected to the guide posts and upper ends that extend to the drill control station, such as a ship, platform, or the like, and guide subsequently employed apparatus into position.

Drilling then proceeds through the surface conductor 26 until the depth is reached for a second string of casing 36, for example, a twenty-inch casing. During this drilling, mud is circulated upward between the drill string, not shown, and the surface conductor.

In the second step of the method, the second string of casing 36 is run through the surface conductor 26, and a second stop collar 38 is connected to the upper end of the second string at a predetermined distance from its lower end. This second collar includes a sleeve 39 having an inner seat 40, and radically extending, circumferentially spaced fins 41 (FIGS. 1 and 2) projecting out from the sleeve. Each fin has an oblique lower edge 42 and an outer vertical edge 43. A landing conductor 45 is connected to the upper end of the sleeve 39, and the second stop collar is landed in the first stop collar 21 with the lower edges of the fins 41 engaging the seat 23. The second string of casing is then cemented, it being noted that returns, resulting from the cementing operation, pass upward between the fins and thence between the surface conductor 26 and the landing conductor 45. In certain geographical areas, it may be advisable to attach blowout preventers, not shown, to the upper end of the landing conductor, and to drill the next hole through such preventers and the second string of casing.

When the proper depth is reached, a third string of casing 50, for example thirteen and three-eighths inch casing, is run into the hole and supported by a third stop collar 51 which is attached to the upper end of the third string of the casing. This collar is similar to the second collar 38 in that it provides a sleeve 52 and a plurality of outer radially extending, circumferentially spaced fins 54 secured to the sleeve. The sleeve is specifically different, however, in providing a lower portion 56 and an upper portion 58 diametrically larger than the lower portion and circumferentially spaced from the sleeve 39 on the second collar. The upper portion of the sleeve 52 also has an annular internal latching groove 59. When the third collar is landed in the second collar, the fins 54 rest on the seat 40. A landing conductor 60 is threaded into the sleeve 52 for running the third string of casing and the third collar down through the landing conductor 45.

Running and hanging the third string of casing 50 constitutes part of the third step of the method which further includes cementing the third string and, thereafter, successively unthreading and removing the surface conductor 26, the landing conductor 45, and the landing conductor 60. Unthreading of these conductors is facilitated by the use of left-hand threads. The condition of the apparatus after the third step can be visualized from FIG. 1 by imagining that conductors 26, 45 and 60 are removed.. It is to be observed that the absence of a blowout preventer at the drilling depths of the third step is of little consequence in most geographical areas because the well pressures encountered do not normally reach blowout magnitudes.

The fourth step of the method is to attach a wellhead 65 (FIGS. 3C–3E) and blowout preventers 67 and 69 (FIGS. 3B–3C) to the third string of casing 50 (FIG. 3E). Before describing how this is done, reference is first made to the structure of the wellhead which, as will be evident from FIGS. 3C–3E, is preferably of the integrated type. This wellhead has a longitudinal passageway 71 therethrough; a lower flange 72; a lower end portion 73 projecting down from the lower flange; an internal lower seat 74; lower, intermediate, and upper latching grooves 75, 76, and 77; lower, intermediate, and upper ports 80, 81, and 82; intermediate and upper recesses 84 and 85; and an upper flange 88. O-rings 90 encircle the lower flange of the wellhead, and a latch mechanism 92, including dogs 93, is mounted on the lower end portion 73.

The lower blowout preventer 67 (FIG. 3C) is preferably of the ram type and has a lower, hydraulically actuated clamp 96 connected to the upper flange 88 of the wellhead 65. The upper blowout preventer 69 (FIG. 3B) is preferably of the Hydril type, and an upper clamp 98 interconnects the upper and lower blowout preventers. A ball point 100 is connected to the upper blowout preventer by an hydraulic storm disconnected clamp 102, and a surface conductor 104 has a lower end attached to the disconnected clamp and an upper end extending to the drill control station, not shown.

A guide system 110 (FIGS. 3A–3E) includes, in addition to the brackets 28, posts 30, and cables 31, guide mounting brackets 112, 113, 114, 115, and 116 connected to the wellhead 65, the blowout preventers 67 and 69, and the ball point 100. Furthermore, this system includes tubes 118, 119 and 120 connected to these brackets receiving the cables therein, and having upper male ends and lower female ends respectively fitting into and receiving adjacent ends of adjacent tubes, except for the lowermost female ends which fit over the posts 30.

Three female couplings 125 (FIGS. 3D–3E), only two of which are shown, are individually connected to the ports 80, 81, and 82 through valves 126 and are mounted on the wellhead 65 by brackets 128. Elongated fluid conducting lines 130 have lower male couplings 132 individually fitted in the female couplings and intermediate portions 134 that are mounted on the lower blowout preventer 67 by brackets 136. In addition, fluid control lines 139, 140, 141, and 142 are respectively connected to the hydraulic clamp 96, the storm disconnect 102, and the blowout preventers 67 and 69. All of these lines 130, 139-142 extend to the drill control station, not shown, alongside of and are clamped to the surface conductor 104.

As seen in FIGS. 3A–3E, the wellhead 65, the lower and upper preventers 67 and 69, the ball joint 100, and the surface conductor 104 are assembled as described and lowered by the surface conductor, being guided by the guide system 110, toward the third stop collar 51. The lower end portion 73 of the wellhead is guided into the upper portion 58 of the sleeve 52 whereupon the latch 92 is automatically actuated, causing the dogs 93 to project into the groove 59 whereby the wellhead is latched to the third stop collar. O-rings 94 and 95 seal the wellhead to the third collar and thus provide a fluid-tight connection between the wellhead and the third string of casing 50. O-rings 90 seal between the wellhead and the sleeve 39 of the second stop collar 38 in order to close off the upper end of the annulus between the second and third strings of casing 36 and 50.

When positioned in this manner, the well apparatus described so far can be controlled from the drill control station, not shown, the surface conductor 104 can be disconnected from the upper blowout preventer 69 in case of a storm, and additional strings of casing and tubing, to be described below, can be hung in the wellhead 65, all under complete control. Accordingly, drilling proceeds through the surface conductor, the blowout preventers, the wellhead, and the third string of casing until the desired depth is reached.

In the fifth and sixth steps of the method (FIG. 3D–E), fourth and fifth strings of casing 150 and 152, for example nine and five-eighths inch and seven-inch casing, respectively, are run into the hole through the third string 50 and are hung in the wellhead 65 on hangers 154 and 156. It is understood, of course, that after the fourth string is run and hung, drilling proceeds through this string to provide a hole for the fifth string of casing. The fourth hanger is landed on the lower seat 74 in the wellhead and includes expandable dogs 158 that latch in the lower groove 75. The fifth hanger includes a ported spacer 160 that seats on the fourth hanger; this spacer provides communication between the intermediate port 81 and the annulus between the fourth and fifth strings of casing. The fifth hanger also has expandable dogs 162 projecting into the intermediate latching groove 76. Both the fourth and the fifth hangers have internal threads 164 and 166, respectively, into which landing pipes, not shown, are threaded for seating the hangers in the wellhead. Further, after each is hung, the fourth and fifth strings of casing are cemented in the well hole, with returns flowing upward through the lower and intermediate ports 80 and 81 respectively.

Before the remaining, and most important, steps of the subject method are described, attention is directed to apparatus that is of particular significance in carrying out these remaining steps. Thus, in order to hang a tubing string 175 (FIGS. 4, 6B–C) in the wellhead 65, a dual tubing hanger 176 (FIG. 6B) of unique construction is provided. This hanger includes telescopically slidably interfitted, tubular inner and outer units 178 and 180. The outer unit includes a body 182 having a lower outer shoulder 184, an outer ledge 186, a lower internal recess 188, a lower internal seat 190, an internal latching groove 192, an upper inner ledge 196, and an upper internal channel 198, all of these being annular. The body also has a generally longitudinally extending duct 200 having an upper end opening into the channel and a lower end opening into the recess. The duct is plugged at 201 to seal the duct above the channel. A ported spacer 202 is connected to the lower end of the body 182, and a packing 203 is positioned between the spacer and the lower shoulder 184.

The outer unit 180 of the hanger 176 also includes a tubular housing 205 surrounding the body 182 and having an internally threaded lower end 206 threaded to the body above the lower outer shoulder 184. This housing has radially opening circumferentially spaced longitudinal keyways 208 and slots 209 above the keyways. Latching dogs 210 are fitted in the slots for radial movement therein. A cap 212 is threaded into the upper end of the housing, and a spring-loaded shear pin 214 is mounted in this cap and projects radially inward of the cap.

The outer unit 180 of the tubing hanger 176 additionally includes a tubular mandrel 218 slidably fitted between the housing 205 and the body 182 and encircling the latter. The mandrel has a lower end 220, an annular outer cam 222, and an annular inner shoulder 223. Keys 224 project outward from the lower end of the mandrel and are individually slidably fitted in the keyways 208. The mandrel also has an upper internally threaded end 225, and an outwardly opening blind hole 226. A stop nut 228 is threaded on the upper end of the mandrel over the cap 212. O-rings 230 encircle the body 182 and seal between the body and the mandrel.

The mandrel 218 (FIG. 6B) has a retracted position, not shown, with the cam 222 engaging the cap and with the hole 226 displaced upward from, but in alignment with, the shear pin 214, the latter being held outward of the mandrel by engagement with its outer surface; in this retracted position, the dogs do not project outward from the housing 205. The mandrel is movable from its retracted position to a latching position wherein the cam engages the dogs and moves the same radially outward in their slots so that they project outward from the housing and wherein the shear pin is spring-urged into the hole 226.

The inner unit 178 (FIG. 6B) of the tubing hanger 176 includes a tubular housing 240 releasably slidably fitted in the body 182 and including a lower outer shoulder 241 engaging the lower seat 190, an internally threaded lower end 242, lower and upper internal ledges 244 and 246, an upper internal seat 247, and circumferentially spaced radially opening keyways 248 and slots 249. Dogs 250 are radially slidably fitted in the slots.

The housing 240 also has a longitudinal duct 255 providing an upper end 256 opening into the annular recess 188 in the body 182 when the housing 240 is seated in the body, and an internally threaded lower end 257. O-rings 260 encircle the housing 240 above and below the upper end of the duct 255 and seal between the housing and the body so as to ensure proper fluid communication between the duct 255 and the duct 200. A cap 265 is threaded into the upper end of the housing 240, and a radially inwardly projecting spring-loaded shear pin 266 is also mounted in this cap.

The inner hanger unit 178 (FIG. 6B) also includes a mandrel 270 that is nearly identical with the mandrel 218. The inner mandrel 270 has a lower end portion 271, an annular outer shoulder 272, an annular outer cam 273, an upper internally threaded end 274, and an outwardly opening hole 275. Keys 276 project outward from the inner mandrel into the keyways 248; O-rings 278 encircle the lower end portion and provide a seal between the inner mandrel and inner housing 240, and a stop nut 280 is threaded onto the upper end 274 of the mandrel. As with the outer unit 180, the mandrel 270 is movable between a retracted position wherein the dogs 250 are retracted and a latching position wherein the cam 273 forces the dogs outward into the latching groove 192 of the outer body 182 and the inner shear pin 266 is spring-urged into the hole 275.

It is significant that the inner and outer units 178 and 180 of the tubing hanger 176 are circumferentially spaced from each other above the upper ledge 196 so as to provide an annulus 285, the function of which will be subsequently described. It is also important that the inner unit can be moved out of the outer unit if the inner shear pin 266 is broken, thereby permitting retraction of the dogs 250. Engagement of the outer shoulder 241 of the inner housing 240 with the seat 190 in the body 182 limits movement of the inner unit, in one direction, with respect to the outer unit.

With the foregoing in mind, the description of the method will be resumed. As the seventh step of the method, the string of tubing 175 is run into the well hole through the fifth string of casing 152 (FIG. 4). The tubing string has an upper section 300 (FIG. 6C) which will be located within the wellhead 65 when the tubing string is at the desired depth in the well. While the upper section 300 is at the surface control station, not shown, a tubing master control valve 301 is connected to this upper section, and a nipple 302 is connected to the valve and to the internally threaded lower end portion 242 of the housing 240 of the tubing hanger 176. This master control valve is preferably a ball-type valve of the type disclosed in the United States Patent No. 2,894,715 to Bostock. The control valve is normally closed but is opened by introducing fluid under pressure through a control tube 304 constituting a part of the valve. The control tube is connected to the duct 255 by a coupling 306.

After the control valve 301 and the tubing hanger 176 are attached, running of the tubing string 175 is continued. For this purpose and in order to land the hanger 176 in the wellhead 65, a landing pipe 310 (FIG. 4) is threaded into the upper end 225 of the mandrel 218. As the tubing string and the tubing hanger are being lowered toward the wellhead, the outer unit 180 of the hanger is in its retracted position whereas the inner unit 178 is in its latching position. When the spacer 202 on the outer body 182 engages the fifth hanger 156 and the packing 203 is energized into sealed engagement with the wellhead and outer body, further downward movement of the body and the tubing string is precluded. Continued downward movement of the landing pipe 310, however, moves the outer mandrel 218 into its latching position whereby the dogs 210 are forced into the upper latching groove 77 in the wellhead 65. The tubing string is thus hung and locked in the wellhead, the tubing hanger is sealed to the wellhead, and the ported spacer establishes communication between the upper port 82 (FIG. 3D) and the fifth string of casing 152. Furthermore, since the master control valve 301 is closed, the well is completely closed below the blowout preventers 67 and 69.

The landing pipe 310 is then unthreaded from the tubing hanger 176 and is removed through the surface conductor 104 (FIGS. 3A-3E). Next, the lower blowout preventer 67 is disconnected from the wellhead, and the blowout preventers 67, 69, the ball joint 100 and the surface conductor are lifted up to the drill control station, not shown, so that after the seventh step is completed, the well apparatus is in the condition illustrated in FIG. 5.

In the eighth step of the method (FIG. 7), a flow line adaptor 320 and a flow line 321 connected to the adapter are lowered toward the wellhead 65. The adapter (FIGS. 6A, 6B and 7) includes an upper body 322 that has a longitudinal bore 323 extending entirely therethrough, a transverse bore 324 establishing fluid communication between the longitudinal bore and the flow line, a lower flange 326 adapted to mate with the upper flange 88 of the wellhead, a tubular lower end portion 328, a tubular upper end portion 329, and an upper flange 330. Packing 333 and a junk ring 334 encircle the lower end portion of the body and are held thereon by a retaining ring 335. The body of the adapter also has a duct 336 having a lower end 337 which opens into an annular channel 338 surrounding the longitudinal bore and an upper end 340 which opens out of the adapter. The duct is plugged at 342. A master valve-control line 344 is connected to the upper end 340 of the duct 336 and is attached to the flow line for extension therewith to a remote control station, not shown, but often on an adjacent shore. A flow line valve 346 is connected in the flow line. Further, an hydraulic clamp 347 is mounted on the adapter body for clamping the lower flange 326 of the adapter to the upper flange 88 of the wellhead.

The adapter 320 also includes a lower sleeve 350 (FIG. 6B) that has an upper end 351 threaded into the longitudinal bore 323 of the adapter 320, a lower end 352, a longitudinal duct 354 having an upper end 356 in fluid communication with the adapter channel 338 and a lower laterally opening end 357. This duct is also plugged at 358 below the lower end 357. O-rings 360 encircle the lower end of the sleeve above and below the lower end 357 of the duct, and O-rings 362 encircle the upper end of the sleeve above and below the upper end 356 of the duct 354. It is to be noted that the sleeve has an outside diameter slightly less than the maximum diameter of the annulus 285 between the outer body 182 and the inner housing 240 and an inside diameter slightly greater than the minimum diameter of the annulus.

Horizontal brackets 370 (FIG. 7) are secured to the body 322 of the adapter 320 and project outward therefrom, and guide tubes 371 are mounted on these brackets and slidably receive the cables 31 of the guide system 110.

A running string 380 is employed for lowering the flow line adapter 320 and the flow line 321. Interconnecting this running string and the flow line adapter are, successively from the top down, a running string connector 381, a bottom hole test adapter 382, a swab valve 383, and a swab valve adapter 384, and an hydraulically actuated clamp 385, the latter being connected to the upper flange 330 of the flow line adapter. Horizontal brackets 388 project out from the connector 381, and tubes 389 on these brackets receive the guide cables 31. Similarly, brackets 390 are provided on the swab valve, and guide tubes 391 on these brackets receive the cables. After the flow line adapter has been guided into proper position, it is clamped to the wellhead. In this position the lower end 352 of the sleeve 350 is slidably fitter into the annulus 285. The parts are dimensioned so that when the lower end 352 of the sleeve 350 is slidably fitted into flange 88 of the wellhead, the lower end 357 of the sleeve duct 354 registers with the hanger channel 198 that leads into the upper end of the hanger duct 200. It is significant, therefore, that when the flow line adapter, the tubing hanger 176, and the tubing string 175 including the master control valve 301 are assembled as described, fluid communication is established between the master valve-control line 344 and the control tube 304 on the master valve; this communication is established primarily through the ducts 200, 255, 336 and 354 which are located internally of the tubing hanger and the adapter.

In order to place the well into a producing condition, the swab valve 383 (FIG. 7) is closed and the master control valve 301 is opened. Fluid under pressure is supplied through control line 344 which conducts this fluid into the adapter duct 336 from where it travels into ducts 354, 200 and 255 and then through coupling 306 into the master valve 301. This fluid pressure opens the master control valve whereby oil flows from the tubing string 175 through the wellhead into the flow line 321. If necessary, the well can first be swabbed to bring it into a flowing condition, in a well-known manner. With the swab valve closed, however, the running string 380 and its connector 381 are removed to the surface of the water.

In the ninth step of the method, an adapter plug running tool 395 (FIG. 8) carrying a bottom hole test adapter plug 396 is connected to the running string 380. This plug, which has an upper fishing neck 397, is held in the running tool by a shear pin 398. Brackets 399 project from the plug tool for connecting it to the guide system 110. The plug is lowered and connected to the bottom hole test adapter 382. As the weight of the running string 380 bears down on the plug 396, the shear pin 398 is broken thereby disconnecting the running tool from the plug 396, and allowing the running string and tool to be removed upward from the plug. The guide cables 31 are connected to a buoy cable, not shown, and are lowered to the ocean floor.

If it is subsequently desired to rework or service the well, including removing the tubing string 175, the flow line valve 346 (FIG. 8) is closed and fluid pressure in the master valve-control line 344 is discontinued thereby causing the master valve 301 to close. Next the plug 396 is removed with an appropriate fishing tool, not shown, but well known in the art. Furthermore, the swab valve 383 and associated adapter 384 are disconnected from the flow line adapter 320 and raised to the surface on a running tool, not shown.

A reworking blowout preventer 405 (FIG. 9) is connected to the lower end of a surface conductor 406 by a ball joint 407, there being a storm-disconnect clamp 408 between the ball joint and the blowout preventer. Further, a hydraulically actuated clamp 409 is connected to the lower end of the blowout preventer. The blowout preventer is lowered with the surface conductor, the latter being guided on the cables 31 by tubes 410 secured to brackets 411 mounted on the ball joint and by tubes 412 secured to brackets 413 projecting from the preventer 405. The blowout preventer is hydraulically clamped to the upper flange 330 of the flow line adapter 320.

It is to be noted that from the time the plug 396 and swab valve 383 are disconnected until the reworking preventer is connected, the well is under complete control since the master valve 301 is closed. The closed flow line valve 346 precludes escape of oil already in the flow line 321.

Tubing 415 (FIG. 9) is then run down through the blowout preventer 405 and threaded into the upper end 274 (FIG. 6B) of the mandrel 270 of the inner hanger unit 178. By lifting on the tubing 415, the shear pin 266 is broken whereby the inner unit and the entire tubing string 175 is raised through the sleeve 350, the longitudinal bore 323 of the flow line adapter 320, past the transverse bore 324, and up through the blowout preventer 405 (FIG. 9) and the surface conductor 406.

It is a significant advantage of the present invention that the tubing string 175 is removed without disturbing the flow line 321; the latter remains in its position adjacent to the ocean floor. Furthermore, the sleeve 350 is not disturbed by the upward movement of the inner unit and the tubing string.

After the well has been reworked, or other servicing operations have been performed, the tubing string 175 is again run into the hole and landed as previously described, and the well is brought into a producing condition by repeating the steps, of those described above, that are required, as will be understood.

It will be evident from the foregoing that the present invention provides a method and apparatus for completing an underwater well and for facilitating reworking and servicing of the well, while maintaining the well under complete control. By following the teachings of the present invention, the flow line can be lowered into operating position and need not be moved thereafter. Thus, the present invention obviates the difficult and expensive task of raising the flow line after it has remained on the ocean floor for a period of time.

Although a preferred method and apparatus have been disclosed, it will be understood that various changes and modifications may be made in the details thereof without departing from the spirit and the scope of the appended claims.

Having described the invention, what is claimed and desired to be secured by Letters Patent is:

1. In a well apparatus, a head, hanger means supported in said head, said hanger means having first and second conducting means therein, a pipe string connected to said hanger means in communication with the first conducting means and including valve means having open and closed positions, said valve means being located in the pipe string below said hanger means, means connecting said valve means to said second conducting means in said hanger means, and means connected to said second conducting means for supplying a valve controlling medium to said valve means through said second conducting means in order to place said valve means in one of its positions.

2. In a well apparatus, a head member, hanger means supported in said head member, said hanger means having first and second fluid duct means therein, a pipe string connected to said hanger means in communication with the first duct means and including a valve having open and closed positions, said valve being located in the pipe string below said hanger means, means connecting said valve to the second duct means in said hanger means, and means communicating with said second duct means for supplying fluid under pressure to said valve through said second duct means in order to place said valve in one of its positions.

3. In a well apparatus, a support, a hanger including a tubular outer portion mounted in said support and a tubular inner portion mounted in but movable upward out of said outer portion, said outer portion of the hanger having a fluid duct therein, said inner portion having a fluid duct communicating with the fluid duct in said outer portion when the inner portion is supported in the outer portion, a pipe string connected to the inner portion of said hanger and being small enough to pass through said outer portion a fluid pressure operated valve connected to said pipe string for permitting and preventing flow of fluid through said string, said valve being connected to the fluid duct in said inner portion, and means communicating with the fluid duct in said outer portion for supplying fluid under pressure to said valve through said ducts thereby to control the position of said valve.

4. In a well apparatus, a wellhead having a fluid passageway therethrough and upper and lower end portions an elongated adapter releasably connected to the upper end portion of said wellhead and having a portion projecting upward from the upper end portion of the wellhead and provided with a longitudinal bore communicating with said passageway in the wellhead and provided with a transverse bore communicating with said longitudinal bore, fluid conducting means connected to said transverse bore, a pipe string having a maximum diameter smaller than the minimum diameter of said longitudinal bore, and means for hanging said string from said wellhead so that said string hangs below the lower end portion of the wellhead and in fluid communication with said longitudinal bore, said means for hanging having means for connecting to means for raising and lowering said string through said longitudinal bore upward and downward past said transverse bore.

5. A well apparatus which provides for removal of pipe string without disturbing a flow line that is in fluid communication with the string when the well is flowing comprising a wellhead, a pipe hanger having an outer portion seated in the wellhead and an inner portion releasably seated in said outer portion, means connecting said pipe string to said inner portion, an adapter releasably connected to said wellhead and projecting upward therefrom, means connecting said flow line to said adapter, said inner hanger portion and said adapter having means establishing fluid communication between said string and said flow line, said adapter having a bore aligned with said outer hanger portion, said bore being diametrically larger than the maximum diameter of either said inner hanger portion or said string, said bore being diametrically smaller than the outer hanger portion, and means for lifting said inner portion and string through said bore up and down past the place where the flow line opens into the bore while said flow line remains connected to said adapter.

6. In a well apparatus, a wellhead having a fluid passageway therethrough; an elongated adapter coupled to said wellhead and having a longitudinal bore communicating with said passageway in the wellhead, a transverse bore communicating with said longitudinal bore, and a duct therethrough; a pipe string diametrically smaller than said longitudinal bore; a fluid pressure-operated valve in said string having closed and open positions respectively preventing and permitting passage of fluid through the string; means in said passageway for hanging said string from said wellhead so that said string and longitudinal bore are a fluid communication and including means for moving said string axially through said longitudinal bore past said transverse bore, said hanging means further including duct means communicating with the duct in the adapter and with the valve when said string is hung from said wellhead, and means connected to said duct in the adapter for supplying fluid under pressure to said valve through said duct and duct means, thereby to control the position of said valve.

7. The apparatus in claim 6 including means for closing the longitudinal bore of said adapter above the transverse bore thereof.

8. The apparatus in claim 6 including a blowout preventer connected to the adapter in communication with the longitudinal bore thereof.

9. In a well apparatus, a wellhead having a fluid passageway therethrough; a hanger including a tubular outer portion mounted in said passageway and a tubular inner portion mounted in said outer portion in assembled relation therewith but being axially movable, in one direction only, out of said outer portion, said inner and outer portions of the hanger having circumferentially spaced upper portions providing an annulus therebetween; an adapter including a body coupled to said wellhead and providing a longitudinal bore communicating with said passageway and a transverse bore communicating with said longitudinal bore, said adapter also including a sleeve projecting into said annulus; a pipe string connected to the inner portion of said hanger, with said inner portion, said sleeve and said longitudinal bore establishing fluid communication between said string and said transverse bore, said string including a fluid-pressure operated valve having closed and open positions respectively preventing and permitting passage of fluid through the string into said inner hanger portion; a flow line connected to said transverse bore; and a control line, said adapter and hanger having fluid ducts therein establishing communication between said control line and said valve when said inner and outer hanger portions are in their assembled relation.

10. In a well apparatus, a wellhead having a fluid passageway therethrough; a hanger including a tubular outer portion mounted in the passageway of said wellhead and a tubular inner portion mounted in but movable axially in one direction out of said outer portion, said outer portion of the hanger having a fluid duct therein, said duct providing upper and lower open ends, the inner portion having a fluid duct providing an upper open end communicating with the lower end of the duct in the outer portion when said inner portion is mounted in said outer portion, the duct in said inner portion having an open lower end, said inner and outer portions of the hanger having circumferentially spaced upper portions providing an annulus therebetween; an adapter including a body coupled to said wellhead and providing a longitudinal bore and a transverse bore communicating with said longitudinal bore, said adapter also including a sleeve connected to said body in communication with said longitudinal bore and projecting into said annulus, said adapter having a control duct providing a lower end in said sleeve registering with the upper end of the duct in said outer portion of the hanger and an upper end in said body; a pipe string connected to the inner portion of said hanger so that said inner portion of said hanger, said sleeve, and said longitudinal bore establish fluid communication between said string and said transverse bore, said string including a fluid-pressure operated valve having closed and open positions respectively preventing and permitting passage of fluid through the string, said valve being connected to the lower end of the duct in the inner portion of said hanger; a flow line connected to said transverse bore; and a control line connected to the upper end of the duct in said adapter for supplying fluid under pressure through said ducts to said valve thereby to control the position of the valve, said pipe string, valve, and inner portion of the hanger being diametrically smaller than and movable upward and downward through said sleeve and longitudinal bore without uncoupling said adapter from said wellhead.

11. A pipe hanger comprising a tubular outer portion having upper and lower ends, a bore, and a duct extending within said outer portion, said duct having a lower end opening inwardly of said outer portion, and an inner tubular portion axially slidably received in the bore of said outer portion, said inner and outer portions having engaging means limiting movement of the inner portion in one direction with respect to the outer portion and permitting movement of the inner portion in the opposite direction with respect to the outer portion, said inner portion having a pipe connecting end portion provided with a duct that has an upper end which communicates with the duct in the outer portion when the lower end of the duct in the outer portion when said inner portion is limited agenst movement in said one direction with respect to said outer portion.

12. A pipe hanger comprising telescopically interfitted, tubular inner and outer members, said members being relatively axially slidable between an interfitted condition, wherein the inner member is precluded from movement in one direction relative to said outer member, and a separated condition, said outer member being provided with a duct having a lower opening, said inner member being provided with a duct having an upper opening, said upper and lower openings being in adjacent confronting as well as communicating relation with each other when said members are in said interfitted condition, and said inner member having an end portion providing means for connection to a pipe string.

13. Well coupling apparatus comprising telescopically slidably interfitted, tubular inner and outer members having first end portions in circumferentially spaced relation to each other and second end portions engaging each other and limiting relative axial movement of said members, said second end portion of the inner member providing means for connecting the inner member to a pipe string, said second end portion of the inner member also including a duct, the outer member including a duct having a first end opening into the space between said first end portions of the members and a second end communicating with the duct in said inner member, and a sleeve projecting into the space between said first end portions of said members and provided with a duct having an open end communicating with said first open end of the duct in the outer member.

14. In a well apparatus, a wellhead, a hanger seated in said wellhead, said hanger having a main flow passage therethrough and an auxiliary duct providing an upper end opening into said passage, a sleeve having a duct extending therethrough and providing a lower end opening outward of said sleeve, and means mounting said sleeve on said wellhead with the sleeve fitted into the passage of said hanger and the lower end of the duct in the sleeve in fluid communication with the upper end of the duct in the hanger.

15. A pipe hanger comprising a tubular outer member having upper and lower end portions and an internal seat, and a tubular inner member axially slidably fitted in said outer member and having upper and lower end portions and an external shoulder rested on said seat, said upper end portions of both members and said lower end portion of said inner mmeber having pipe connecting means thereon, said outer member having a duct extending therethrough that is provided with a lower open end and an opposite open end, and said inner member having a duct extending therethrough that is provided with an upper open end communicating with the lower open end of the duct in said outer member when said shoulder rests on said seat, the duct in said inner member opening exteriorly of the inner member, said upper end portions of said member being in circumferentially spaced relation to each other thereby defining an annulus, and said opposite open end of the duct in said outer member opening into said annulus.

16. In a method for completing an underwater well through a submerged wellhead and a blowout preventer attached to the top of the wellhead, the steps of lowering a string of pipe through said preventer and wellhead, hanging said string in the wellhead in fluid-tight relation therewith, said string being blocked to the flow of fluid upward therein from the well into the wellhead, replacing the blowout preventer with a flow line and attached flow line adapter that connects to said wellhead and establishes fluid communication between said string and said flow line, and opening said string to the passage of fluid upward through said string, into said wellhead and adapter, and into said flow line.

17. In a method of completing an underwater well through a wellhead adjacent to the ocean floor and a blowout preventer attached to the top of the wellhead, the steps of lowering a string of pipe through said blowout preventer and wellhead, hanging said string in the wellhead in fluid-sealed relation therewith, said string being blocked to the flow of fluid upward therein from the well into the wellhead, replacing the blowout preventer with a flow line adapter that has a longitudinal bore coaxial with the wellhead and a transverse flow line bore communicating with said longitudinal bore and opening laterally outward from said adapter, closing the longitudinal bore in the adapter above the transverse bore thereof, and opening said string to the passage of fluid under pressure from said string through said wellhead and longitudinal bore into said transverse bore.

18. In a method of completing an underwater well through a wellhead located near the ocean floor and a blowout preventer attached to the top of the wellhead, the steps of lowering a string of pipe, including a valve therein, through said preventer and wellhead, hanging said string in the wellhead in fluid sealed relation therein, detaching and separating the blowout preventer from the wellhead, said valve preventing fluid under pressure in the string from escaping up through the string into the wellhead, attaching a flow line adapter to the top of the wellhead, said adapter having a longitudinal bore coaxial with the wellhead and a transverse bore communicating with the longitudinal bore and opening laterally outward from the adapter, there being a flow line connected to the transverse bore, closing the longitudinal bore above the transverse bore, and opening the valve to allow fluid under pressure in the string to flow through the wellhead, the longitudinal bore, and the transverse bore into the flow line.

19. In a method of completing an underwater well through a submerged wellhead and a blowout preventer attached to the top of the wellhead so that reworking or servicing of the well is facilitated, the steps of lowering a string of pipe, in which fluid flow upward therethrough is blocked, through said blowout preventer and wellhead and hanging said string in the wellhead in fluid sealed relation therewith, replacing the blowout preventer with a flow line adapter and flow line, the latter being connected to the adapter and extending laterally outward therefrom, said adapter having a lower end in communication with the string through the wellhead and an upper end, said longitudinal bore communicating with the flow line between said upper and lower ends, closing the upper end of the longiutdinal bore, opening the string to allow fluid under pressure to flow through the string and longitudinal bore into said flow line, subsequently closing said string to the passage of fluid when it is desired to rework or service the well, opening the upper end of the longitudinal bore, attaching a blowout preventer to the top of the adapter in communication with said longitudinal bore, and removing said string through the wellhead, the longitudinal bore, and the last mentioned blowout preventer without disturbing the flow line or its connection to the adapter.

20. In a well apparatus, a support, a hanger including an outer portion mounted in said support and an inner portion mounted in but movable upward out of said outer portion, said outer portion of the hanger having a fluid duct therein, said inner portion having a fluid duct communicating with the fluid duct in said outer portion when the inner portion is supported in the outer portion, pipe connected to the inner portion of said hanger and being small enough to pass through said outer portion, a fluid pressure operated means connected to said pipe for permitting and preventing flow of fluid through said pipe, said pressure operated means being connected to the fluid duct in said inner portion, and means communicating with the fluid duct in said outer portion for supplying fluid under pressure to said pressure operated means through said ducts thereby to control the position of said pressure operated means.

21. In a well apparatus, a pipe hanger having a main fluid passage therethrough and an auxiliary fluid duct spaced from said main passage, a pipe string including a pressure-operated valve, said valve having a flow passage therethrough and means for conducting fluid under pressure to said valve for opening and closing the valve, means connecting said pipe string to said hanger with said passages in fluid communication, and means coupling said conducting means to said duct in the hanger.

22. In a method for completing a well through a wellhead and a blowout preventer attached to the top of the wellhead, the steps of lowering a string of pipe through said preventer and wellhead, hanging said string in the wellhead in fluid-tight relation therewith, said string being blocked to the flow of fluid upward therein from the well into the wellhead, replacing the blowout preventer with a flow line and attached flow line adapter that connects to said wellhead and establishes fluid communication between said string and said flow line, and opening said string to the passage of fluid upward through said string, into said wellhead and adapter, and into said flow line.

References Cited by the Examiner
UNITED STATES PATENTS

| | | | |
|---|---|---|---|
| 1,909,304 | 5/1933 | Mueller | 251—1 X |
| 3,087,547 | 4/1963 | Raulins et al. | 166—89 |
| 3,096,103 | 7/1963 | Murphy | 175—215 X |
| 3,151,680 | 10/1964 | Parkhurst et al. | 166—89 |
| 3,171,489 | 3/1965 | Cole et al. | 166—.5 |
| 3,189,098 | 6/1965 | Haeber | 166—.6 |
| 3,190,354 | 6/1965 | Stone | 166—89 X |
| 3,219,118 | 11/1965 | Lewis | 166—.6 |

ERNEST R. PURSER, *Primary Examiner.*